United States Patent
Bäbler

[11] Patent Number: 6,063,182
[45] Date of Patent: May 16, 2000

[54] STIR-IN PIGMENT COMPOSITIONS

[75] Inventor: Fridolin Bäbler, Hockessin, Del.

[73] Assignee: Ciba Speciality Chemicals Corporation, Tarrytown, N.Y.

[21] Appl. No.: 09/213,009

[22] Filed: Dec. 16, 1998

Related U.S. Application Data

[63] Continuation-in-part of application No. 09/148,937, Sep. 4, 1998, abandoned.
[60] Provisional application No. 60/058,154, Sep. 8, 1997, and provisional application No. 60/059,768, Sep. 23, 1997.

[51] Int. Cl.$^7$ .............................. C09C 3/08; C09B 67/02; C09B 67/00
[52] U.S. Cl. ..................... 106/506; 106/410; 106/413; 106/414; 106/419; 106/429; 106/432; 106/433; 106/448; 106/450; 106/451; 106/452; 106/453; 106/455; 106/460; 106/471; 106/476; 106/479; 106/480; 106/491; 106/493; 106/494; 106/495; 106/496; 106/497; 106/498; 106/499; 524/104
[58] Field of Search ...................... 106/493, 494, 106/495, 496, 497, 498, 499, 506, 410, 413, 414, 419, 429, 432, 433, 448, 450, 451, 452, 453, 455, 460, 471, 476, 479, 480, 491; 524/104

[56] References Cited

U.S. PATENT DOCUMENTS

| | | | |
|---|---|---|---|
| 3,806,464 | 4/1974 | Matrick et al. | 252/316 |
| 3,904,562 | 9/1975 | Hopfenberg et al. | 260/22 |
| 5,145,524 | 9/1992 | Ganci | 106/493 |
| 5,274,010 | 12/1993 | Bugnon et al. | 523/206 |
| 5,401,780 | 3/1995 | Bugnon et al. | 523/206 |
| 5,554,217 | 9/1996 | Bäbler | 106/494 |
| 5,569,529 | 10/1996 | Becker et al. | 428/331 |
| 5,584,922 | 12/1996 | Babler | 106/417 |
| 5,820,666 | 10/1998 | Babler | 106/412 |

FOREIGN PATENT DOCUMENTS

| | | |
|---|---|---|
| 57-49664 | 3/1982 | Japan . |
| 58-208351 | 12/1983 | Japan . |
| 1537223 | 4/1977 | United Kingdom . |

OTHER PUBLICATIONS

Patent Abstracts of Japan, abstract No. JP363191864A, abstract of Japanese Patent Specification No. 03–191864, Aug. 1988.

*Primary Examiner*—Anthony J Green
*Attorney, Agent, or Firm*—David R. Crichton

[57] ABSTRACT

A stir-in pigment composition for coloring high-molecular-weight material, particularly coatings and ink systems, comprises 85 to 99.5 parts by weight of a pigment and 0.5 to 15 parts by weight of an additive comprising a vinylpyrrolidone polymer or copolymer. The stir-in pigment composition is in the form of microgranules and is obtainable by spray drying a high solids content aqueous pigment dispersion containing the pigment and the additive. The new pigment composition powders are easily handled, easily wetted and disperse rapidly to form homogeneous aqueous pigment dispersions which are practically free of larger pigment aggregates and can readily be incorporated into aqueous ink and paint systems as stir-in pigments without a dispersion step in a bead mill.

28 Claims, No Drawings

STIR-IN PIGMENT COMPOSITIONS

This application is a Continuation-In-Part of U.S. patent application Ser. No. 09/148,937, filed Sep. 4, 1998, now abandoned, which claimed the benefit under 35 U.S.C. Section 1.119(e) of U.S. Provisional Application Ser Nos. 60/058,154, filed Sep. 8, 1997 and 60/059,768, filed Sep. 23, 1997.

SUMMARY

The present invention relates to stir-in pigment compositions. More particularly it relates to new stir-in pigment compositions for pigmenting high molecular weight organic material, comprising 85 to 99.5 parts by weight of a pigment and 0.5 to 15 parts by weight of an additive comprising a vinylpyrrolidone polymer or copolymer.

BACKGROUND

Organic stir-in pigments are known and are described for example in U.S. Pat. No. 5,554,217. These known stir-in pigments and stir-in pigment compositions show excellent stir-in properties when applied in paint and ink systems, particularly solvent-based systems. They have the great advantage that they can be incorporated into an ink or paint system by simply stirring the pigment powder into the paint system without the time and energy-consuming dispersion step in a bead mill.

It is also known to use certain pigment preparations, also called master batches, having a pigment concentration of 30 to 60 weight percent based on the preparation, as stir-in pigments. Such stir-in preparations show excellent properties in certain applications. However, they do have the disadvantage of employing an expensive preparation process, and occasionally they show incompatibility in some application media due to the high amount of carrier additives.

Many patents describe processes for pigment surface modifications to enhance certain pigment properties like color strength or rheological properties, for example by the addition of pigment derivatives such as pigment sulfonic acids, sulfonamides or other pigment derivatives. However, such treated pigments need to be dispersed for many hours in a bead mill in order to incorporate the pigment into a paint vehicle.

U.S. Pat. No. 3,806,464 discloses the encapsulation of pigments with an acrylic interpolymer, and Japanese published patent application SHO 57-49664A describes a process for the preparation of pigment compositions containing thermoplastic resins which can be dissolved in water with a basic substance. Although these pigments contain polar polymers, they are different from the present inventive pigment compositions because they contain different kinds of additives. Furthermore, they show incompatibility in certain application media. Therefore, their use as pigment compositions has not been wide-spread.

Other patents, such as U.S. Pat. Nos. 5,274,010 and 5,401,780, describe a process for warp-free pigmenting of polyolefins by coating the pigment surface with a polyvinylalcohol or other polar polymers such as acrylic polymers, cellulose derivatives, maleic anhydride-styrene copolymers and polyvinylpyrrolidone, alone or in combination with silane and zirconium acetylacetonate films. The coating of the pigment is achieved by (A) absorption of a preformed, soluble polymer onto the pigment or (B) by polymerization of a corresponding monomer in the presence of the pigment. In either case the resulting coated pigment is recovered by filtration from an aqueous suspension. Such suspensions are difficult to filter and can show strong bleed-through of very finely divided pigment particles. Therefore filter aids are often added to improve the filtration rates. However, the presence of these filter aids in the pigment composition can lead to incompatibility of the resulting coated pigments when applied in substrates other than polyolefins. Additionally, such pigment suspensions contain a large quantity of unabsorbed polymer which is dissolved in the aqueous medium and thus remains in the filtrate after filtration. This highly colored filtrate then requires special treatment in order to recover or degrade the soluble polymer and to decrease the filtrate's color to environmentally acceptable levels.

U.S. Pat. No. 5,145,524 discloses surface modification of pigments by treatment with polyvinylalkyl ethers to obtain pigments with enhanced properties for automotive finish systems. This surface treatment also improves the flow properties of the pigment in aqueous systems, leading to aqueous pigment dispersions with a higher solids content for direct application in waterborne paint systems. Such pigment dispersions can have the drawback of foaming and settling. Additionally, they require the addition of antifouling agents. Moreover, in most cases they still need to be dispersed in a bead mill for optimum dispersion.

U.S. Pat. No. 3,904,562 describes a process for encapsulating finely divided organic pigment particles with a polymeric outer layer by a precipitation process. This process is costly and environmentally unfriendly due to the use of a large quantity of an inorganic salt to induce precipitation of the polymer from the aqueous medium. Additionally, the particles encapsulated according to the teachings of this patent require a higher molecular weight polyvinylpyrrolidone and a larger amount of polymer based on the pigment to ensure complete encapsulation, which can adversely affect the compatibility of the pigment when it is applied in various different substrates.

Japanese laid open patent application SHO 58-208351 describes pigment compositions comprising a pigment and a water soluble copolymer of an ethylenically unsaturated sulfonic acid compound and a N-vinylpyrrolidone compound. Said pigment compositions can be incorporated into aqueous vehicles by simple mechanical stirring without a dispersion step. However, due to the presence of the polymeric sulfonic acids, these pigment compositions may not be suitable for many applications, for example, application in automotive paint systems, since it is well known that the strongly polar polysulfonic acids have a detrimental effect on the curing of the coating system. Additionally, the presence of the polysulfonic acids can enhance water absorption, which can further damage the weatherability of the pigmented coating system.

Due to environmental concerns and new environmental regulations the paint industry is moving extensively from solvent borne to aqueous borne coatings systems. Newly developed improved aqueous polymeric binder systems are helping to speed up this transformation, but they also force pigment manufacturers to continually modify their pigments to adapt the pigment properties to the latest customer needs.

The present invention relates to new stir-in pigment compositions in the form of microgranules comprising 85 to 99.5 parts by weight of a pigment and 0.5 to 15 parts by weight of an additive which comprises a vinylpyrrolidone polymer or copolymer. These new microgranule stir-in pigment compositions are obtainable by spray drying a high solids content aqueous pigment dispersion containing the pigment and the additive. They manifest enhanced pigment properties when applied in aqueous ink and paint systems, particularly those used in industrial coatings, trade sales and the automotive industry.

Unexpectedly, it was discovered that such stir-in pigment compositions can effortlessly be incorporated into aqueous ink and paint systems as a stir-in pigment without carrying out a dispersion step in a bead mill. Compared to conventionally dried and micropulverized pigments, the new pigment compositions are generally less dusty and can be more easily handled. They are also easily wetted and disperse rapidly to form homogeneous aqueous pigment dispersions which are practically free of larger pigment aggregates. Many small particle size pigments are known to aggregate during the drying process. However, even with pigments exhibiting this aggregation tendency, surprisingly, the inventive microgranular stir-in pigment compositions are easily dispersible in aqueous paint systems. Moreover such stir-in pigment compositions have the great advantage that they are compatible with a variety of aqueous paint and ink systems, including the most demanding automotive paint systems. Additionally, the new stir-in pigment compositions are obtainable by a very simple, economical and environmentally friendly method in conventional equipment.

DETAILED DESCRIPTION

This invention relates to stir-in pigment compositions which are in the form of microgranules and comprise from 85 to 99.5 parts, preferably 90 to 99 parts and most preferably 94 to 99 parts by weight of a pigment and from 0.5 to 15 parts, preferably 1 to 10 parts and most preferably 1 to 6 parts by weight of an additive comprising a vinylpyrrolidone polymer or copolymer, with the proviso that the copolymer is not a copolymer of an ethylenically unsaturated sulfonic acid and N-vinylpyrrolidone. These new microgranular stir-in pigment compositions are obtainable by spray drying a high solid content aqueous pigment dispersion containing the pigment and the additive. They are useful for coloring high molecular weight materials.

A wide variety of vinylpyrrolidone homo- or copolymers are suitable as additives for preparing the inventive stir-in pigment compositions. In general, the vinylpyrrolidone homopolymer is a polyvinylpyrrolidone obtained by polymerization of 1-vinyl-2-pyrrolidone (also known as vinylpyrrolidone, N-vinylpyrrolidone and NVP) by processes known per se. Such polymers are well known and many are commercially available. Preferably the weight average molecular weight of the polyvinylpyrrolidone is no more than 300,000; most preferably it is between 5,000 and 200,000.

Suitable vinylpyrrolidone copolymers are, for example, copolymers of vinylpyrrolidone with vinylether or vinylalcohol; acrylic or methacrylic acid or an ester or amide thereof, and particularly with vinylacetate.

Especially suitable are water-soluble copolymers such as water-soluble polyvinylpyrrolidone vinylacetate copolymers having a vinylpyrrolidone to vinylacetate ratio of from 70 to 30 to 60 to 40.

Depending on the pigment employed in the inventive stir-in pigment composition and its application medium, it can be advantageous to use the vinylpyrrolidone homo- or copolymer additive in admixture with other preferably water-soluble polymers, copolymers and/or polymer derivatives. Such polymers are for example polyacrylic acid, polymethacrylic acid, polymaleic anhydride, polyurethane, polyvinylether, polyvinylalcohol, polyalkylene glycol, polyethylene oxide, cellulose derivatives, polyimine, polyvinylpyridine, or copolymers such as copolymers of acrylic acid with styrene, acrylonitrile, vinylacetate, vinylphosphonate, vinylpropionate, vinylchloride, itaconic acid or maleic anhydride, or a mixture thereof. Suitable polymeric derivatives are for example ethoxylated or propoxylated fatty amines such as ethoxylated cocoalkyl, oleyl or soyaalkyl amines; ethoxylated or propoxylated fatty quaternary salts such as ethoxylated cocoalkyltrimethyl ammonium chloride; ethoxylated fatty amides such as ethoxylated oleamides; alkyl-, cycloalkyl- or alkylaryl-oxypoly (ethylenoxy)-ethanol, cycloalkyloxypoly(ethylenoxy)-laurate or -oleate, polyethylene glycol 400-laurate or -oleate, alkyl-, cycloalkyl- or alkylaryl-poly(ethylenoxy)-carboxylate or -phosphonate. An especially preferred cycloalkyloxypoly(ethylenoxy)-laurate or -oleate is for example a poly(ethylenoxy)sorbitan-laurate or -oleate. These other preferably water-soluble polymers, copolymers and/or polymer derivatives are known per se and are commercially available.

The total amount of the vinylpyrrolidone homo- or copolymer additive and other preferably water-soluble polymers, copolymers and/or polymer derivatives in the inventive pigment composition is preferably no more than 20 parts by weight, most preferably from 5 to 15 parts by weight. Preferably such a mixture comprises at least 20%, most preferably 20 to 80% by weight of the vinylpyrrolidone polymer or copolymer. If the other polymer, copolymer and/or polymer derivative is an anionic or cationic polymer, the polymer additive mixture is preferably dissolved as salts in a basic or acidic aqueous medium. Advantageously an anionic polymer or polymer derivative or copolymer is dissolved in water as an alkylammonium, sodium, potassium or an ammonium salt.

Especially suitable pigments for the present stir-in pigment compositions are organic pigments selected from the group consisting of azo, azomethine, methine, anthraquinone, phthalocyanine, perinone, perylene, diketopyrrolopyrrole, thioindigo, iminoisoindoline, dioxazine, iminoisoindolinone, quinacridone, flavanthrone, indanthrone, anthrapyrimidine and quinophthalone pigments, or a mixture or solid solution thereof; especially an azo, dioxazine, diketopyrrolopyrrole, quinacridone, phthalocyanine, indanthrone or iminoisoindolinone pigment, or a mixture or solid solution thereof.

Notable pigments useful in the present stir-in pigment compositions are those pigments described in the Color Index, including the group consisting of C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Yellow 191.1, C.I. Pigment Yellow 74, C.I. Pigment Yellow 83, C.I. Pigment Yellow 13, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, and C.I. Pigment Green 36, or a mixture or solid solution thereof.

Suitable inorganic pigments useful in the present stir-in pigment compositions are selected from the group consisting of carbon black, metal oxides, mixed metal oxides, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, and bismuth vanadate, and mixtures thereof.

Generally, the pigment according to this invention has an average particle size in the range of from 0.001 to 30 µm, preferably within the range from 0.005 to 5 µm. Based on these average particle size ranges, it is clear that the pigment is used in the form of a pigment crude or a conditioned pigment. Preferably the pigment is used in its aqueous presscake form as obtained for example by the isolation of the pigment after synthesis or conditioning. Additionally, the pigment can contain customary additives, such as inorganic fillers, light stabilizers and/or antiflocculating agents.

The expression "inorganic filler" means a substantially transparent inorganic pigment. For example, mica, kaolin, talc, wollastonite and natural or synthetic silica, e.g. glass, are well-known inorganic fillers that are suitable for use in the pigment compositions of the present invention. Talc, muscovite mica and kaolin are highly suitable inorganic fillers.

Transparent micas are especially suitable for use as an inorganic filler. Of the micas, muscovite, phlogopite, brolite and synthetic micas are most suitable.

The inorganic filler is preferably used in its natural form, but treated transparent or semitransparent inorganic filler pigments, for example a mica treated with a metal oxide, or talc treated with an organic aliphatic compound, such as a long chain aliphatic acid, may also be employed. In general, the inorganic filler consists of primary filler particles having any geometric shape, but a flaked shape is preferred. Preferably the inorganic filler has an average particle size in the range of 0.5 to 10 µm and a maximum particle size of below 20 µm.

Typically the inorganic filler is used in a concentration of 1 to 30 percent based on the weight of the pigment.

Light stabilizers, such as U.V. absorbers and hindered amine light stabilizers, are known in the art. They may be used in any suitable, effective amount in the present pigment compositions as long as they do not impair the stir-in pigment properties of the composition.

Antiflocculating agents, also described as rheology improving agents or particle growth inhibitors, are well known in the pigment industry and are suitable as additives for the present pigment compositions. Generally antiflocculating agents are for example, pigment derivatives such as the sulfonic acid, sulfonic acid salts or sulfonamide derivatives of organic pigments. Typically rheology improving agents are used in a concentration of 0.5 to 8 percent based on the weight of the organic pigment.

The inorganic filler, light stabilizer and/or antiflocculating agent is incorporated into the composition before, during or after the spray drying step. Preferably, these customary additives are added prior to the spray drying step. Depending on the customary additive, it is preferably added at the end of the synthesis or conditioning step, before the isolation of the pigment, or it is added into a reslurried high solids content aqueous pigment presscake dispersion.

In a preferred method, a highly concentrated pigment presscake is slurried in any suitable device at temperatures between 5 to 90° C., preferably 20 to 60° C., such as, for example, a Cowles® disperser, in the presence of the aqueous additive solution as illustrated in the examples below to obtain a homogeneous aqueous dispersion. Suitable conditions for spray drying the homogeneous aqueous dispersions can then easily be determined by a person skilled in the art.

Due to the known pronounced fluidizing effect of the additives employed according to this invention, low viscosity aqueous pigment dispersions with a solids content of above 20% or, depending on the pigment and polymeric additive or additive mixture, solids contents of 25% and above can be easily generated. Despite the high pigment concentration, these pigment dispersions have the advantage that they are liquid, easily flowable and ideally suited for spray drying.

Spray drying is a well known drying technology in the chemical industry. Any equipment which is conventional for spray drying can be used to spray dry the inventive pigment compositions. Suitable commercially available equipment includes the BOWEN BLS spray dryer from Bowen or the NIRO ATOMIZER from NIRO Company.

Due to their high solids content, the inventive pigment dispersions are dried rapidly and economically by spray drying, yielding unique pigment composition powders composed of microgranules. The additives according to this invention are homogeneously distributed in the stir-in pigment compositions and also serve as the binder for the microgranules.

Typically, the microgranules have a size in the range of from 1 to 1000 µm, preferably from 3 to 300 µm when suspended in a water-immiscible solvent such as xylene and observed under the light microscope. They can have any shape. The shape and size of the microgranules are influenced by several parameters such as the kind and particle size of the pigment, the kind and concentration of the additive or additive mixture respectively, as well as the spray drying conditions and the spray dryer equipment. Because of the larger particle size of the microgranules, they are generally less dusty and and can be more easily handled than conventionally dried and micropulverized pigments.

The inventive pigment compositions are easily wetted in aqueous ink or paint systems. Surprisingly they are dispersed quickly by simply stirring the pigment into an aqueous ink or paint system without a dispersion step in a bead mill or other high shear-inducing equipment. Thus the inventive pigment compositions are ideal for use as stir-in pigments in aqueous systems, where they eliminate the time and energy-consuming step of bead milling as well as the expense of cleaning the bead mills.

In general, an effective pigmenting amount of the stir-in pigment composition is incorporated into the high molecular weight organic material to be pigmented. An effective pigmenting amount is any amount suitable to provide the desired color in the high molecular weight organic material. In particular, the stir-in pigments are used in an amount of 0.01 to 30% by weight, preferably 0.1 to 10% by weight, based on the weight of the high molecular weight organic material to be pigmented.

The pigmented, high molecular weight organic materials which are colored according to the present process are useful in a variety of applications. For example, the high molecular weight organic material can be used for the pigmentation of lacquers, inks and enamel coating compositions. The pigmented high molecular weight organic materials prepared according to the present invention are particularly useful for preparing automotive coating paints.

The high molecular weight organic materials which are colored according to the present process are, for example, cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine, formaldehyde resins, urea/formaldehyde resins, epoxy resins and diene rubbers or copolymers thereof.

High molecular weight organic materials which are useful for heat-curable or cross-linked coatings, for example chemically-reactive coatings, are also colored according to the present process. The pigmented, high molecular weight organic materials prepared according to the present process are especially useful in stoving finishes which contain customary binders and which are reactive at high temperature. Examples of the high molecular weight organic materials which are used in such coatings include acrylic, alkyd, epoxy, phenolic, melamine, urea, polyester, polyurethane, blocked isocyanate, benzoguanamine or cellulose ester resins, or combinations thereof. The pigmented, high molecular weight organic materials prepared according to the present process are also useful in air-drying or physically-drying coatings.

The present stir-in pigment compositions are particularly suitable for preparing pigmented coatings of the types conventionally employed in industrial paints, particularly in the automobile industry, especially aqueous acrylic/melamine resin, alkyd/melamine resin, thermoplastic acrylic resin or polyurethane resin systems.

Due to the excellent dispersibility of the stir-in pigment compositions of this invention, uniform distribution of pigment particles throughout the entire application media is readily achieved. Compositions containing the present stir-in pigments show excellent rheological behavior.

The present stir-in pigment compositions are used alone or in the presence of other pigments or dyes. It is especially useful to color a high molecular weight organic material with the present stir-in pigment compositions in conjunction with an effect pigment.

The color effect and shade are varied by varying the kind of the effect pigment and the concentrations of the effect pigment and the stir-in pigment composition of the present invention. Particularly striking effect shades are generated by using the stir-in pigments with known transparent titanium dioxide-coated mica or aluminum pigments.

Due to their unique pigment properties, the new stir-in pigment compositions are also suitable for coloring high-molecular-weight organic materials which are plastics that are calendered, cast, molded or processed to fibers and the like. The pigment compositions impart excellent physical properties to colored plastic articles such as polypropylene or polyamide fibers, plastic films, bottle crates and so on. Thus, the present invention further embraces processes wherein the high molecular weight organic compound is a plastic that is calendered, cast, molded or processed to fibers and to plastic articles that are calendered, cast, molded or processed to fibers.

The new stir-in pigment compositions are easily dispersible when incorporated into high performance plastics such as for example polyethylene, polypropylene, ABS or polyamide. Surprisingly, the resulting colored molded products show practically no flow lines, proving the pigment compositions are very homogeneously distributed in the polymer. As one skilled in the art appreciates, the presence of flow lines is undesirable.

The inventive pigment compositions are also suitable for the preparation of liquid colors, since they can provide liquid colors with a high pigment solids content. Liquid colors are well known in the pigment industry and are mainly used to color plastic materials.

Additionally, the inventive pigment compositions are suitable for use in ink jet formulations.

The following examples illustrate various embodiments of the invention, but the scope of the invention is not limited thereto. In the examples, all parts are by weight unless otherwise indicated.

EXAMPLE 1

A 40 gallon stainless steel vessel is charged with 18.2 kg aqueous presscake containing 7.7 kg dry weight 3,6-di(4-chlorophenyl)-1,4-diketopyrrolopyrrole pigment (C.I Pigment Red 254), IRGAZIN® DPP Red BO, from CIBA Specialty Chemicals Corp., Newport Dela.).

In a separate container 600 grams of a 50% aqueous polyvinylacetate/vinylpyrrolidone solution (LUVISKOL VA 73W from BASF) and 173.7 grams of a poly(ethyleneoxy) sorbitan laurate (WITCONOL 2720 from Witco Corp.) are dissolved in 5 liters of water. Then 1550 grams ULTRA Talc 609 from Barretts Minerals Inc. are added into the aqueous resin solution and stirred until completely wetted.

The aqueous talc/resin mixture is added to the diketopyrrolopyrrole pigment presscake. The mixture is stirred with a Cowles® dissolver, generating an easily flowable liquid red pigment dispersion with a solids content of 37.8%. The highly concentrated pigment dispersion is spray dried in a pilot plant spray dryer (the BOWEN BLS from Bowen) with 40 psig air heated to an inlet temperature of 400±5° C. (exit temperature 125±3° C.), yielding 9.5 kg red stir-in pigment composition which can easily be incorporated into an aqueous paint system without a dispersion step in a bead mill as a stir-in pigment to yield strong opaque red coatings of excellent durability.

EXAMPLE 2

A 40 gallon stainless steel vessel is charged with 19.5 kg aqueous presscake containing 8.2 kg dry weight 3,6-di(4-chlorophenyl)-1,4-diketopyrrolopyrrole pigment IRGAZIN DPP Red BO, from CIBA Specialty Chemicals Corp.

In a separate container 683 grams of an aqueous polyvinylpyrrolidone solution (LUVISKOL K30 from BASF Corp.) are dissolved in 5 liters of water. Then 2050 grams ULTRA Talc 609 from Barretts Minerals Inc. are added into the aqueous resin solution and stirred until completely wetted.

The aqueous talc/resin mixture is added to the diketopyrrolopyrrole pigment presscake. The mixture is stirred with a Cowles® dissolver, generating an easily flowable liquid red pigment dispersion with a solids content of around 38%. The highly concentrated pigment dispersion is spray dried in a pilot plant spray dryer (the BOWEN BLS from Bowen) yielding 10.2 kg red stir-in pigment composition which can easily be incorporated into an aqueous paint system without a dispersion step in a bead mill as a stir-in pigment to yield strong opaque red coatings of excellent durability.

EXAMPLE 3

A 4 liter WARING Blender from Cole-Parmer Instrument Company is charged with 2286 grams aqueous presscake containing 802 grams dry weight isoindolinone pigment IRGAZIN YELLOW 3 RLTN (C.I. Pigment Yellow 110 from CIBA Specialty Chemicals Corp., Newport Dela.).

In a one liter glass beaker 59.6 grams of an aqueous polyvinylpyrrolidone solution (LUVISKOL K30 from BASF Corp.) are dissolved in 200 ml water. Then 80.2 grams ULTRA Talc 609 from Barretts Minerals Inc. are added into the aqueous resin solution and stirred until completely wetted.

The aqueous talc/resin mixture is added to the yellow isoindolinone pigment presscake in the WARING blender. The mixture is blended at medium to high speed generating an easily flowable liquid yellow pigment dispersion.

Two batches of the above aqueous yellow pigment dispersion are combined, followed by spray drying in a pilot plant spray dryer (the BOWEN BLS from Bowen) yielding 1.78 kg yellow stir-in pigment composition which can easily be incorporated into an aqueous paint system without a dispersion step in a bead mill as a stir-in pigment to yield strong opaque yellow coatings of excellent durability.

When dispersed in xylene and observed in a light microscope, spherical microgranules ranging in size from 20–100 µm can be observed along with many smaller granules having a size of 5–15 µm.

EXAMPLE 4

A 4 liter WARING Blender is charged with 1692 grams aqueous presscake containing 687 grams dry weight 2,9-dichloroquinacridone magenta pigment (MONASTRAL® Magenta B from CIBA Specialty Chemicals Corp., Newport Dela.).

In a one liter glass beaker 83.8 grams of an aqueous polyvinylpyrrolidone solution (LUVISKOL K30 from BASF Corp.) are dissolved in 250 ml water. Then 125.6 grams ULTRA Talc 609 from Barretts Minerals Inc. are added into the aqueous resin solution and stirred until completely wetted.

The aqueous talc/resin mixture is added to the magenta pigment presscake in the WARING blender. The mixture is blended at medium to high speed generating a pasty dispersion. Then 62.7 g LUVISKOL K-30 are added together with 750 ml water, yielding on further blending a fluid presscake.

Two batches of the aqueous magenta pigment dispersion are combined, followed by spray drying in a pilot plant spray dryer (the BOWEN BLS from Bowen) yielding a magenta stir-in pigment composition which can easily be incorporated into an aqueous paint system without a dispersion step in a bead mill as a stir-in pigment to yield magenta coatings of excellent durability.

EXAMPLE 5

A 4 liter WARING Blender is charged with 3093 grams aqueous presscake containing 866 grams dry weight quinacridone pigment C.I. Pigment Violet 19 (MONASTRAL® Red Y RT-759-D from CIBA Specialty Chemicals Corp., Newport Dela.).

In a one liter glass beaker 86.7 grams of an aqueous polyvinylpyrrolidone solution LUVISKOL K30 from BASF Corp. are dissolved in 350 ml water. Then 86.6 grams ULTRA Talc 609 from Barretts Minerals Inc. are added into the aqueous resin solution and stirred until completely wetted.

The aqueous talc/resin mixture is added to the quinacridone pigment presscake in the WARING blender. The mixture is blended at medium to high speed, generating a fluid pigment dispersion.

The pigment dispersion is spray dried in a pilot plant spray dryer (the BOWEN BLS from Bowen) yielding a red stir-in pigment composition which can easily be incorporated into an aqueous paint system without a dispersion step in a bead mill as a stir-in pigment to yield red coatings of excellent durability.

EXAMPLE 6

A four liter WARING blender is charged with 1909 grams aqueous presscake containing 750 grams dry weight of a small particle size carbazole dioxazine pigment C.I. Pigment Violet 23 (CROMOPHTAL® Violet GT from Ciba Specialty Chemicals Corp.).

In a one liter glass beaker 64.1 grams of an aqueous 30% polyvinylpyrrolidone solution LUVISKOL K30 from BASF Corp. are dissolved in 600 ml water. The solution is added to the carbazole dioxazine presscake and the beaker is rinsed with 500 ml water.

The aqueous resin/pigment mixture is blended at medium to high speed generating a fluid pigment dispersion.

The pigment dispersion is spray dried in a pilot plant dryer (the BOWEN BLS from Bowen) yielding a dark violet stir-in pigment composition which can easily be incorporated in aqueous paint and ink systems. When incorporated into an aqueous ink system, the inventive carbazole dioxazine pigment composition obtained according to the above procedure provides inks with a high color strength, excellent durability and an outstanding gloss behavior.

When dispersed in xylene and observed under the light microscope many round micro granules in the size of 20–300 µm and many smaller granules having a size of 5–15 µm are observed.

EXAMPLE 7

A 4 liter WARING Blender is charged with 2206 grams aqueous presscake containing 953 grams dry weight azo pigment C.I. Pigment Yellow 191.1 (CROMOPHTAL® Yellow HRP from CIBA Specialty Chemicals Corp., Newport Dela.).

In a one liter glass beaker 63.5 grams of an aqueous polyvinylpyrrolidone solution LUVISKOL K30 from BASF Corp. are dissolved in 400 ml water. Then 95.3 grams ULTRA Talc 609 from Barretts Minerals Inc. are added into the aqueous resin solution and stirred until completely wetted.

The aqueous talc/resin mixture is added to the azo pigment presscake in the WARING blender. The mixture is blended at medium to high speed generating a pasty pigment dispersion. An additional 111 grams LUVISKOL K30 is diluted with 400 ml water and added to the pigment paste. The mixture is blended further at medium to high speed resulting in a fluid yellow pigment dispersion.

Two batches of the above aqueous yellow pigment dispersion are combined and spray dried in a pilot plant spray dryer (the BOWEN BLS from Bowen) yielding a yellow stir-in pigment composition which can easily be incorporated into an aqueous paint system without a dispersion step in a bead mill as a stir-in pigment to yield yellow coatings of excellent durability.

When dispersed in xylene and observed in a light microscope, spherical microgranules ranging in size from 20–100 µm can be observed along with many smaller granules having a size of 5–15 µm.

EXAMPLE 8

The procedure of Example 7 is repeated; however, using as organic pigment a pigment mixture of 1103 grams aqueous presscake containing 476 grams C.I. Pigment Yellow 191.1 and 1600 grams aqueous presscake containing the transparent diketopyrrolopyrrole pigment, C.I. Pigment Red 254, both from CIBA Specialty Chemicals Corp., providing a scarlet-colored pigment mixture which can be applied in aqueous ink, paint and trade sales coatings yielding strongly colored scarlet finishes with an excellent durability.

EXAMPLE 9

This example demonstrates the incorporation of a stir-in pigment composition containing the 3,6-di(4-chlorophenyl)-1,4-diketopyrrolopyrrole pigment (C.I Pigment Red 254) in an aqueous automotive paint system, without a dispersion step, directly as a stir-in pigment.

Stir-In Pigment Dispersion

An 8 oz jar is charged with 38.8 grams polymeric aqueous dispersant and 121.2 grams deionized water. The mixture is stirred for 5 to 10 minutes. Then 40 grams of the pigment composition prepared according to Example 1 is added into the aqueous resin dispersion by stirring at medium speed to yield a pigment dispersion. The red pigment dispersion is stirred at medium to high speed with a propeller stirrer for 15 minutes yielding a homogenous "stir-in pigment dispersion", containing 20.0% pigment composition with a total solids content of 30% and having a pigment/binder ratio of 2:1.

Paint Dispersion

The following are mixed:
25.0 grams "stir-in pigment dispersion"
8.2 grams compensating clear color resin solution and
66.0 grams balanced clear color resin solution.

The viscosity of the resulting paint dispersion is adjusted to 1500–2000 cps with deionized water and by the addition of sufficient 2-amino-2-methyl-1-propanol to obtain a pH of around 7.6, and then sprayed onto a panel twice at 1.5 minute intervals as basecoat. After 2 minutes, a solvent based clearcoat resin is sprayed twice at 1.5 minute intervals onto the basecoat. The sprayed panel is then flashed with air in a flash cabinet for 10 minutes and then "baked" in an oven at 265° F. (130° C.) for 30 minutes, yielding a high chroma red-colored panel with excellent weatherability. A microscopic evaluation shows a homogeneous distribution of the pigment particles in the coating system.

EXAMPLE 10

This example demonstrates the incorporation of a stir-in pigment composition containing the isoindolinone pigment (C.I Pigment Yellow 110) into an aqueous automotive paint system, without a dispersion step, directly as a stir-in pigment.

Stir-In Pigment Dispersion

An 8 oz jar is charged with 38.8 grams polymeric aqueous dispersant and 121.2 grams deionized water. The mixture is stirred for 5 to 10 minutes. Then 40 grams of the pigment composition prepared according to Example 3 is added into the aqueous resin dispersion by stirring at medium speed to yield a pigment dispersion. The yellow pigment dispersion is stirred at medium to high speed with a propeller stirrer for 15 minutes, yielding a homogenous "stir-in pigment dispersion", containing 20.0% pigment composition with a total solids content of 30% and having a pigment/binder ratio of 2:1.

Paint Dispersion

The following are mixed:
25.0 grams "stir-in pigment dispersion"
8.2 grams compensating clear color resin solution, and
66.0 grams balanced clear color resin solution.

The resulting yellow paint dispersion is sprayed onto a panel according to the procedure described in Example 9, yielding highly saturated yellow coated panels which show an excellent weatherability A microscopic evaluation of the coating shows a homogeneous appearance of the coating.

EXAMPLE 11

This example demonstrates the incorporation of a stir-in pigment composition containing the azo pigment C.I. Pigment Yellow 191.1 into HDPE.

Five grams of the pigment composition prepared according to Example 7, 2.5 grams hindered amine light stabilizer, 1.0 gram benzotriazole UV absorber, 1.0 gram hindered phenol antioxidant and 1.0 gram phosphite process stabilizer, all from the Additives Division of CIBA Specialty Chemicals Corporation, are mixed together with 1000 grams of high density polyethylene (HDPE) from U.S.I. QUANTUM Chemicals at a speed of 175–200 rpm for 30 seconds after flux. The fluxed pigmented resin is chopped up while warm and malleable, and then fed through a granulator. The resulting granules are molded on an injection molder with a 5 minutes dwell time and a 30 second cycle time at temperatures of 204 and 260° C. Homogeneously colored chips are obtained which show a bright yellow color with similar color shades at each of the temperatures and with an excellent light stability. The molded yellow chips show no flow lines when placed in front of a light source and observed.

Similar results are achieved starting from 12.5 grams of a liquid color suspension comprising the liquid vehicle and the pigment composition obtained according to Example 6 at a concentration of 40%. The liquid color suspension is prepared by simply stirring the pigment composition into the liquid vehicle without a dispersion step in a high shear mixer.

EXAMPLE 12

This Example demonstrates the incorporation of a stir-in pigment composition into a universal trade sale paint system.

A glass beaker is charged with 63.5 grams propylene glycol, 37.8 grams deionized water 10.8 grams Alcolec S from the American Lecithin Company, Danbury Conn., and 23 grams IGEPAL CO-530 from GAF Chemicals, Wayne N.J., The mixture is stirred for 10 minutes and the pH is adjusted to 8.0–8.5 with diluted ammonia. Then 15 grams of the scarlet stir-in pigment composition prepared according to Example 8 is added. The resulting suspension is further stirred at medium to high speed with a propeller stirrer for 20 minutes resulting a homogeneous pigment dispersion which can be easily incorporated into aqueous latex dispersions yielding strongly scarlet-colored paints with excellent durability.

I claim:

1. A stir-in pigment composition in the form of microgranules, which comprises 85 to 99.5 parts by weight of a pigment and 0.5 to 15 parts by weight of an additive comprising a vinylpyrrolidone polymer or copolymer, with the proviso that the copolymer is not a copolymer of an ethylenically unsaturated sulfonic acid and N-vinylpyrrolidone.

2. A pigment composition of claim 1, which comprises 90 to 99 parts by weight of the pigment and 1 to 10 parts by weight of the additive.

3. A pigment composition of claim 2, which comprises 94 to 99 parts by weight of the pigment and 1 to 6 parts by weight of the additive.

4. A pigment composition obtained by spray drying an aqueous pigment dispersion which comprises 85 to 99.5 parts by weight of a pigment and 0.5 to 15 parts by weight of an additive comprising a vinylpyrrolidone polymer or copolymer.

5. A pigment composition of claim 1, wherein the additive is a vinylpyrrolidone polymer with a weight average molecular weight of no more than 300,000.

6. A pigment composition of claim 1, wherein the additive is a vinylpyrrolidone polymer with a weight average molecular weight of 5,000 to 200,000.

7. A pigment composition of claim 1, wherein the additive is a copolymer of vinylpyrrolidone with vinylether, vinylalcohol, vinylacetate; or acrylic or methacrylic acid or an ester or amide thereof.

8. A pigment composition of claim 1, wherein the additive is a water-soluble polyvinylpyrrolidone/vinylacetate copolymer with a vinylpyrrolidone to vinylacetate weight ratio of from 70 to 30 to 60 to 40.

9. A pigment composition of claim 1, wherein the additive comprises a mixture of the vinyl pyrrolidone or vinylpyrrolidone copolymer with one or more other neutral, anionic or cationic water soluble polymers, copolymers and/or polymer derivatives,
wherein
   a) said water soluble polymer is polyacrylic acid, polymethacrylic acid, polymaleic anhydride, polyurethane, polyvinylether, polyvinylalcohol, polyalkyleneglycol, polyethylenoxide, polyimine or polyvinylpyridine or cellulose derivatives, or copolymers thereof,
   b) said water soluble copolymer is a copolymer of acrylic acid with styrene, acrylonitrile. vinylacetate, vinylphosphonate, vinylpropionate, vinylchloride, itaconic acid or maleic anhydride, or a mixture thereof,
   c) said polymer derivative is an ethoxylated or propoxylated fatty amine; ethoxylated or propoxylated fatty quaternary salt: ethoxylated fatty amide: an alkyl-, cycloalkyl- or alkylaryloxypoly(ethylenoxy)ethanol, cycloalkyloxypoly (ethylenoxy)laurate or oleate, polyethylenglycol-400 laurate or oleate or an alkyl-, cycloalkyl- or alkylaryl-poly(ethylenoxy)carboxylate or phosphonate, and
   d) said water soluble cycloalkyloxypoly(ethylenoxy) laurate or oleate polymer derivative is a poly(ethylenoxy) sorbitan laurate or oleate
and wherein the total amount of the mixture of additives is less than 20 parts by weight of the pigment composition.

10. A pigment composition of claim 9, wherein the additive contains at least 20% by weight of the vinylpyrrolidone or a vinylpyrrolidone copolymer.

11. A pigment composition of claim 9, wherein the mixture contains 20% –80% by weight of the vinylpyrrolidone or vinylpyrrolidone copolymer.

12. A pigment composition of claim 9, wherein said anionic or cationic polymers or copolymers or polymer derivatives are dissolved in an aqueous medium.

13. A pigment composition of claim 12, wherein said anionic polymer or polymer derivative or copolymer is dissolved in water as an alkylammonium, sodium, potassium or an ammonium salt.

14. A pigment composition of claim 12, wherein said cationic polymer is polyvinylpyridine or polyimine.

15. A pigment composition of claim 1, wherein said pigment is an organic or inorganic pigment or a mixture thereof.

16. A pigment composition of claim 1, wherein the pigment is organic and is selected from the group consisting of azo, azomethine, methine, anthraquinone, phthalocyanine, perinone, perylene, diketopyrrolopyrrole, thioindigo, dioxazine, iminoisoindoline, iminoisoindolinone, quinacridone, flavanthrone, indanthrone, anthrapyrimidine and quinophthalone pigments, and mixtures or solid solutions thereof.

17. A pigment composition of claim 16, wherein the organic pigment is selected from the group consisting of C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Yellow 74, C.I. Pigment Yellow 83, C.I. Pigment Yellow 13, C.I. Pigment Yellow 191.1, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, and C.I. Pigment Green 36, and mixtures or solid solutions thereof.

18. A pigment composition of claim 1, wherein the pigment is inorganic and is selected from the group consisting of carbon black, metal oxides, mixed metal oxides, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, and bismuth vanadate, and mixtures thereof.

19. A pigment composition of claim 1, wherein said pigment is a mixture of 70 to 99 parts by weight of an organic pigment and 1 to 30 parts by weight of an inorganic filler, wherein said inorganic filler is selected from the group consisting of mica, kaolin, talc, wollastonite and natural or synthetic silica, and mixtures thereof.

20. A process for the preparation of the pigment composition of claim 1 which comprises (A) preparing an aqueous solution of the additive;
   (B) slurrying a pigment in the solution to obtain a homogeneous liquid dispersion comprising 85 to 99.5 parts by weight of the pigment and 0.5 to 15 parts by weight of the additive,
   (C) spray drying the resulting liquid dispersion to produce dried microgranules and
   (D) collecting the dried microgranules of the pigment composition.

21. A process of claim 20, wherein an aqueous presscake of the pigment is slurried in the solution.

22. A pigmented high molecular weight organic material, which comprises an effective pigmenting amount of a pigment composition according to claim 1 and a high molecular weight organic material.

23. A pigmented high molecular weight organic material of claim 22, wherein the high molecular weight organic material is a coating or an ink system selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine/formaldehyde resins, urea/formaldehyde resins, epoxy resins, diene rubbers and copolymers thereof.

24. A pigmented high molecular weight organic material of claim 22, wherein the high molecular weight organic material is a heat-curable or cross-linkable reactive coating system.

25. A pigmented high molecular weight organic material of claim 24, wherein the reactive coating system is an acrylic alkyd, epoxy, phenolic, melamine, urea, polyester, polyurethane, blocked isocyanate, benzoguanamine or cellulose ester resin, or a combination thereof.

26. A pigmented high molecular weight organic material of claim 24, wherein the high molecular weight organic material is a waterborne coating system which comprises an acrylic/melamine, alkyd/melamine, polyurethane or thermoplastic acrylic resin.

27. A pigmented high molecular weight organic material of claim 23, wherein the high-molecular-weight organic material is a plastic that is calendered, cast, molded or processed to fibers and to plastic articles that are calendered, cast, molded or processed to fibers.

28. A process for the preparation of a pigmented high molecular weight organic material, which comprises incorporating a pigment composition according to claim 1 into the high molecular weight organic material as a stir-in pigment.

* * * * *